Oct. 12, 1965   H. RUMÖLLER   3,212,004
SCREENING DEVICE AGAINST INTERFERENCE VOLTAGES
Filed May 3, 1961
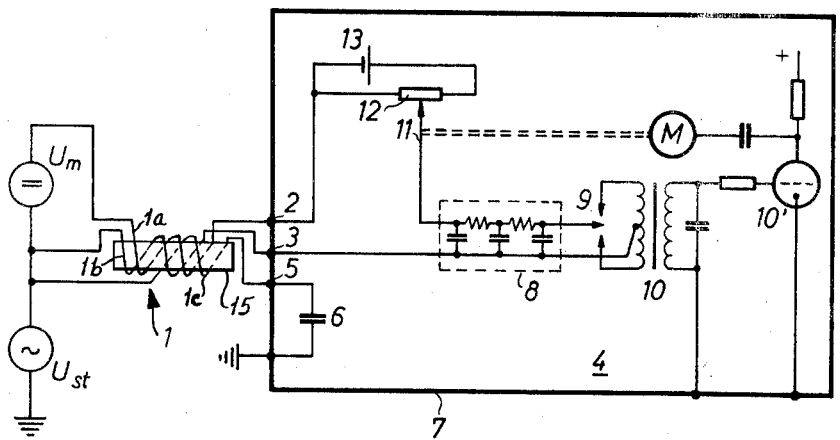
INVENTOR
HERMAN RUMÖLLER
BY
AGENT

United States Patent Office 3,212,004
Patented Oct. 12, 1965

3,212,004
SCREENING DEVICE AGAINST INTERFERENCE VOLTAGES
Herman Rumöller, Gronwohld, Post Trittau, Germany, assignor to North American Philips Company, Inc., New York, N.Y., a corporation of Delaware
Filed May 3, 1961, Ser. No. 107,482
Claims priority, application Germany, June 11, 1960, P 25,162
8 Claims. (Cl. 324—127)

This invention relates to a screening device against unsymmetrical interference voltages in electronic indication apparatus and recording apparatus, respectively, which are responsive to a measuring voltage and operate according to the compensation principle. As is well known to those skilled in the art, in such applications, it is customary to ground the aforementioned apparatus to the housing generally provided therefor. When the measuring voltage source is connected, in a unipolar manner, to a grounded interference voltage source of low resistance, such as, for example, a thermoelement in a conductive connection with a machine aggregate which in turn is grounded, and the ground of the interference voltage source has a different ground potential from the ground of the housing of the indication or recording apparatus, interference voltages cannot be eliminated by connecting the housing to ground. Some improvement could be obtained by utilizing a bifilar choke having two windings of exactly the same number of turns which are very closely coupled together and connected in the measuring lead. However, in this case the current supplied by the interference voltage source through the choke coils also causes a voltage drop at the ohmic resistor in the indicator apparatus and this voltage drop appears as a symmetrical interference voltage in the measuring circuit. Owing to the high sensitivity of the compensation method or principle utilized by the aforementioned apparatus, this symmetrical interference voltage would influence the compensation process and would cause an erroneous indication and recording, respectively.

This drawback is mitigated by a screening device, according to the invention, comprising a trifilar choke having windings of the same number of turns which are closely coupled together and is provided at the input of the electronic indication or recording apparatus. Two windings of the trifilar choke are utilized to conduct the measuring voltage and the associated measuring current in opposite senses, whereas the third winding connected to earth is utilized to consume the unsymmetrical interference voltage.

The current supplied by the interference voltage source flows through one winding of the choke. The voltages induced thereby in the other two windings are equal. Therefore, substantially no additional symmetrical interference voltage occurs, while at the same time the unsymmetrical interference voltage is reduced to a negligible minimum.

The invention will now be described with reference to the accompanying drawing, the sole figure of which is a schematic diagram illustrating, by way of example, only, one embodiment of the present invention. In the drawing, the trifilar choke is indicated by the reference numeral 1 and comprises the windings 1a, 1b, 1c having the same number of turns and wound on a common iron core 15. The windings 1a and 1b have approximately, or as much as possible, the same ohmic resistance, while the winding 1c may have an ohmic resistance of approximately 25% of the value of the windings 1a and 1b, respectively. The inductive reactance of the windings in itself is several hundred K ohm at 50 c./s. The windings 1a and 1b are connected to the input terminals 2 and 3 of apparatus of the indication or recording type and which in the present case is illustrated, by way of example only, as a recording apparatus 4 which is known per se and operates according to the compensation principle. $U_m$ and $U_{st}$ indicate the measuring voltage and interference voltage sources, respectively. This apparatus may be used to measure the temperature of the windings of an alternating current machine. In this case, the measuring voltage $U_m$ represents the output voltage of a thermocouple element or similar device. The point at which the temperature is measured will generally have a high A.C. voltage with respect to the machine housing, and this interference voltage is represented by the A.C. source $U_{st}$ in the drawing.

The winding 1c of the trifilar choke is connected to the terminal 5 which in turn is connected through a capacitor 6 to the grounded housing of the recording apparatus 4.

The equality of the voltages induced in the windings 1a and 1b is somewhat influenced by the asymmetries of the windings which cannot always be avoided. Therefore, it is recommended to incorporate an interference voltage filter 8 at the input of the primary winding of transformer 10 when using the trifilar choke. The filter will substantially prevent any residual interference voltage appearing at terminals 2 and 3 from appearing in transformer 10, which would adversely affect the accuracy of the indication provided by recording apparatus 4. Since the measuring current flows through the choke windings 1a and 1b in opposite senses, the choke does not constitute an inductive resistance in the measuring circuit. The interference voltage source $U_{st}$ causes an interference current to flow in winding 1c and capacitor 6 to ground. This current induces equal voltages in winding 1a and 1b thereby reducing the interference voltage appearing at terminals 2 and 3 substantially to zero potential, while producing little or no effect on the measuring voltage $U_m$ at terminals 2 and 3. The grounding of the choke (connection of winding 1c to "earth") normally i.e., preferably, occurs through a capacitor 6 so as to avoid short-circuiting of possible direct voltages. The ground capacitor 6 may be incorporated in the recording apparatus, as shown, between terminal 5 and the grounded housing of the recording apparatus 4, thereby providing a low-impedance path to ground for the interference A.C. currents flowing in winding 1c.

As far as the operation of the recording apparatus 4 is concerned, it is noted that the direct voltage supplied to terminals 2 and 3 by direct voltage source $U_m$ is chopped by a chopper 9 and actuates the servomotor M for the tapping 11 of the potentiometer 12 via a transformer 10 and amplifier stage 10' until the direct voltage at the terminals 2 and 3 is compensated by an equally large reverse voltage. The measuring potentiometer 12 is fed from the direct voltage source 13.

Owing to the trifilar choke 1, and/or in combination with the interference voltage filter 8 it is possible as such to measure voltage sources by means of recording apparatus which operate according to the compensation principle, which sources have unsymmetrical voltages as high as 90 v. The upper limit is only imposed by the construction of the choke. It is quite possible to produce chokes for higher unsymmetrical interference voltages, for example, to measure the temperature of a 220 v. bus-bar.

What is claimed is:

1. In combination, a first source of measuring voltage having output means associated therewith, a second grounded source of unsymmetrical interference voltage coupled to said first source, indicator means of the compensation principle type responsive to said measuring voltage, and screening means coupled to said indicator means to screen said indicator means from said unsymmetrical interference voltage, said screening means comprising a choke having trifilar windings of substantially an equal number of turns and in close mutual coupling relationship, two of said trifilar windings being coupled to said output means to apply and conduct in an opposite manner said measuring voltage and measuring current associated therewith, respectively, to said indicator means, and the other of said trifilar windings being in a commonly grounded coupling relationship with said indicator means and coupled to said second source to consume said unsymmetrical voltage.

2. A combination according to claim 1 further comprising filter means coupled to said two trifilar windings to screen said indicator means from symmetrical interference voltages present in said two windings.

3. A combination according to claim 1, wherein each of said two trifilar windings has a resistance of substantially equal values, and said other trifilar winding has a resistance value having a predetermined numerical relationship to said equal values.

4. A combination according to claim 1 further comprising capacitor means to couple said other trifilar winding to said indicator means and effectuate said commonly grounded coupling relationship therebetween.

5. In a system for suppressing interference voltages, the combination comprising a first ungrounded source of measuring voltage having output means, a second grounded source of unsymmetrical interference voltage serially connected with said first voltage source, indicator means responsive to said measuring voltage, and screening means for coupling said first source to said indicator means and for screening said indicator means from said unsymmetrical interference voltage, said screening means comprising inductive means having first, second, and third trifilar windings of substantially identical number of turns and in close mutual coupling relationship, said first and second windings being coupled between said output means and said indicator means to apply said measuring voltage thereto, thereby to cause the associated measuring current to flow in said first and second windings in opposite directions, said third winding being connected between a common point of said first and second voltage sources and a point of reference potential in said indicator means thereby to provide a low impedance current path for said source of interference voltage.

6. Apparatus as described in claim 5 wherein said first, second and third windings are mutually coupled in a manner such that interference currents flowing in said third winding induce equal voltages in said first and second windings and of the same sense.

7. In a system for suppressing interference voltages, the combination comprising a first source of measuring voltage having output means, a second source of unsymmetrical interference voltage serially connected with said first voltage source and a point of first reference potential, indicator means responsive to said measuring voltage and having a second reference potential point, and screening means for coupling said first source to said indicator means and for screening said indicator means from said unsymmetrical interference voltage, said screening means comprising inductive means having first, second, and third trifilar windings of substantially identical number of turns and in close mutual coupling relationship, said first and second windings being coupled between said output means and said indicator means to apply said measuring voltage thereto, thereby to cause the associated measuring current to flow in said first and second windings in opposite directions, capacitance means connected in series with said third winding, and means for connecting said series combination of said third winding and said capacitance means between the common connection point of said first and second voltage sources and said point of second reference potential in said indicator means.

8. Apparatus as described in claim 7 wherein said measuring voltage is a direct voltage and said interference voltage is a low frequency alternating voltage.

References Cited by the Examiner

UNITED STATES PATENTS

| 1,379,184 | 5/21 | Hazeltine | 333—79 |
| 1,833,867 | 11/31 | Houck | 333—79 |
| 1,998,960 | 4/35 | Karr | 333—25 |
| 2,654,836 | 10/53 | Beck et al. | 333—25 |
| 2,733,412 | 1/56 | Alexander | 333—12 |
| 2,748,202 | 5/56 | McAllister et al. | 333—12 |
| 2,865,006 | 12/58 | Sabaroff | 333—26 |
| 2,931,985 | 4/60 | Offner | 333—12 |
| 3,047,804 | 7/62 | Peer et al. | 324—149 |
| 3,054,926 | 9/62 | Graham | 333—12 |

FOREIGN PATENTS 702,132   1/41   Germany.

HERMAN KARL SAALBACH, *Primary Examiner.*

BENNETT G. MILLER, *Examiner.*